(12) United States Patent
Buerger et al.

(10) Patent No.: US 11,177,722 B2
(45) Date of Patent: Nov. 16, 2021

(54) AUTOMOTIVE ELECTRICAL GAS PUMP

(71) Applicant: PIERBURG PUMP TECHNOLOGY GMBH, Neuss (DE)

(72) Inventors: Frank Buerger, Langerwehe (DE); Andreas Wulf, Duesseldorf (DE); Wolfgang Pilenz, Neukirchen-Vluyn (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 16/464,684

(22) PCT Filed: Dec. 22, 2016

(86) PCT No.: PCT/EP2016/082286
§ 371 (c)(1),
(2) Date: May 29, 2019

(87) PCT Pub. No.: WO2018/113965
PCT Pub. Date: Jun. 28, 2018

(65) Prior Publication Data
US 2019/0326798 A1 Oct. 24, 2019

(51) Int. Cl.
*H02K 9/22* (2006.01)
*H02K 11/33* (2016.01)
*F02M 37/08* (2006.01)
*F04D 13/06* (2006.01)
*F04D 29/42* (2006.01)
*F04D 29/58* (2006.01)
*H02K 1/12* (2006.01)
(Continued)

(52) U.S. Cl.
CPC ............... *H02K 9/22* (2013.01); *F02M 37/08* (2013.01); *F04D 13/0606* (2013.01); *F04D 29/426* (2013.01); *F04D 29/5806* (2013.01); *F04D 29/5893* (2013.01); *H02K 1/12* (2013.01); *H02K 5/04* (2013.01); *H02K 7/14* (2013.01); *H02K 11/33* (2016.01); *F02M 2037/085* (2013.01)

(58) Field of Classification Search
CPC .. H02K 9/22; H02K 7/24; H02K 5/04; F02M 37/08; F04D 13/0606; F04D 29/426
USPC ........................................................ 310/86
See application file for complete search history.

(56) References Cited

U.S. PATENT DOCUMENTS 5,402,028 A * 3/1995 Koeber ................ H02K 1/143
310/216.009
6,111,334 A 8/2000 Horski et al.
(Continued)

FOREIGN PATENT DOCUMENTS

| CN | 102159835 A | 8/2011 |
| CN | 103089711 A | 5/2013 |

(Continued)

*Primary Examiner* — Terrance L Kenerly
(74) *Attorney, Agent, or Firm* — Norman B. Thot

(57) ABSTRACT

An automotive electrical gas pump includes an electronically commutated motor which drives a motor rotor to rotate within a motor can. The motor has a motor stator which comprises at least one static electro-magnetic coil. An electronic circuit board drives the at least one electro-magnetic coil. A mounting frame includes a motor can and a stator bed. The stator bed embeds the motor stator at least in part. The mounting frame is made of a plastic material which includes a thermally high-conductive filler material.

11 Claims, 3 Drawing Sheets

(51) Int. Cl.
*H02K 5/04* (2006.01)
*H02K 7/14* (2006.01)

(56) References Cited

U.S. PATENT DOCUMENTS

| | | | |
|---|---|---|---|
| 2007/0152523 A1* | 7/2007 | Bookout | H02K 5/08 310/87 |
| 2011/0133582 A1* | 6/2011 | Bingler | F04D 13/08 310/71 |
| 2011/0241454 A1 | 10/2011 | Stachr | |
| 2012/0007452 A1* | 1/2012 | Bingler | H02K 5/1282 310/43 |
| 2014/0161630 A1 | 6/2014 | Binder et al. | |
| 2016/0265538 A1 | 9/2016 | Lee | |
| 2017/0025927 A1 | 1/2017 | Weerts et al. | |

FOREIGN PATENT DOCUMENTS

| | | |
|---|---|---|
| CN | 105952652 A | 9/2016 |
| DE | 10 2015 214 789 A1 | 7/2016 |
| EP | 2 607 708 A1 | 6/2013 |
| EP | 2 905 471 A1 | 8/2015 |
| GB | 2 496 014 A | 5/2013 |
| JP | H 10-24192 A | 1/1998 |
| WO | WO 2015/150545 A1 | 10/2015 |

* cited by examiner

AUTOMOTIVE ELECTRICAL GAS PUMP

CROSS REFERENCE TO PRIOR APPLICATIONS

This application is a U.S. National Phase application under 35 U.S.C. § 371 of International Application No. PCT/EP2016/082286, filed on Dec. 22, 2016. The International Application was published in English on Jun. 28, 2018 as WO 2018/113965 A1 under PCT Article 21(2).

FIELD

The present invention relates to an automotive electrical gas pump.

BACKGROUND

The present invention in particular relates to an automotive gas pump comprising an electronically commutated motor, wherein the motor comprises a motor stator with at least one static electro-magnetic coil and a motor rotor rotating within a motor can. The motor drives a pump rotor. The gas pump further comprises an electronic circuit board for driving the electro-magnetic coil.

An automotive gas pump comprising a brushless electronically commutated motor comprises a printed circuit board with power semi-conductors for commutating the motor. The power semi-conductors can heat up significantly when the automotive gas pump is driven under a full load. High thermal load can destroy the power semi-conductors. The state of the art suggests cooling the power semi-conductors to overcome these problems.

US 2014/0161630 A1 describes an electric fluid pump comprising a containment shell which separates a wet section from a dry section, and a pump wheel which is mechanically connected to a permanently excited motor rotor, both being provided in the wet section. A stator of the electric motor and an electronic circuit board for electronically commutating the motor are provided in the dry section. Thermally conductive platelets are arranged between the containment shell and the semi-conductors of the electronic circuit board so that heat of the semi-conductors is transferred to the fluid in the containment shell.

The state of the art does not address the problem of dissipating heat produced by the motor stator although the temperature of the stator coils can also rise. The ohmic resistance of the stator coils rises with increasing temperature so that the temperature of the motor stator coils further increases and the electric efficiency deteriorates.

SUMMARY

An aspect of the present invention is to provide an automotive electrical gas pump with an improved thermal management and an increased efficiency.

In an embodiment, the present invention provides an automotive electrical gas pump which includes a motor which is configured to be electronically commutated and to drive a motor rotor to rotate within a motor can. The motor comprises a motor stator which comprises at least one static electro-magnetic coil. An electronic circuit board is configured to drive the at least one electro-magnetic coil. A mounting frame comprises a motor can and a stator bed. The stator bed is configured to at least in part embed the motor stator. The mounting frame is made of a plastic material comprising a thermally high-conductive filler material.

BRIEF DESCRIPTION OF THE DRAWINGS

The present invention is described in greater detail below on the basis of embodiments and of the drawings in which.

DETAILED DESCRIPTION

Figure 1:
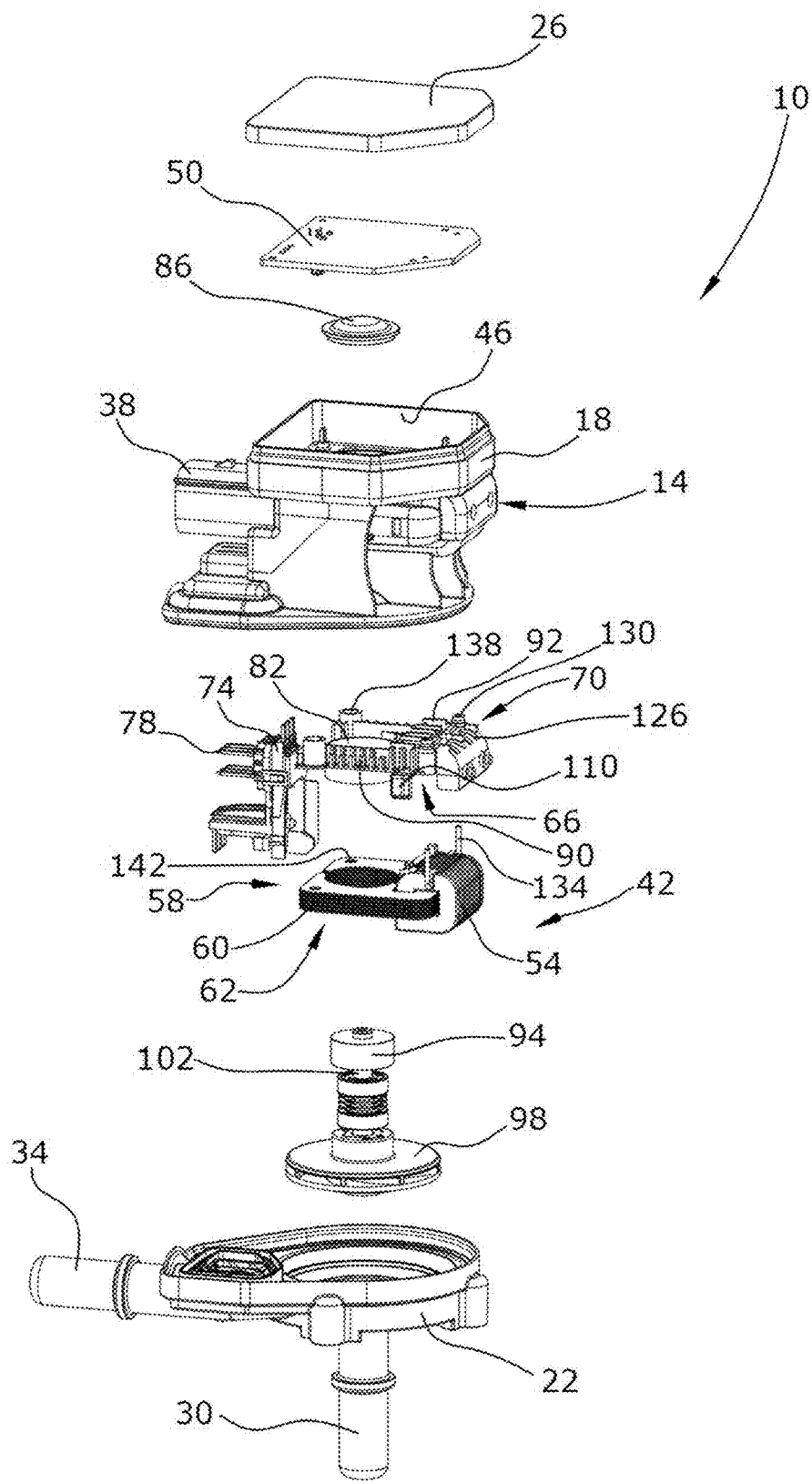
FIG. 1 shows an exploded view of an embodiment of the automotive electrical gas pump according to the present invention.

According to the present invention, the pump motor is provided with an internal mounting frame with a stator bed and the motor can. The stator bed embeds the motor stator at least in part. The mounting frame does not define relevant parts of the pump housing. The mounting frame is made of plastic material and comprises a thermally high-conductive filler material. The motor stator can, for example, be partly overmolded by the plastic material of the mounting frame. A maximum contact surface area between mounting frame and the motor stator is realized thereby. As the thermal transition increases by increasing the contact surface area, a thermal load of the motor stator is effectively transferred to the mounting frame. The mounting frame further forms and defines a part of the motor can so that the mounting frame is in direct contact with the pumped gas of the pump. The heat of the motor stator is thereby directly dissipated to the cool gas medium. The gas as a pumping medium of the pump is continuously exchanged by the pump so that the cooling effect is continuous.

The mounting frame defines the complete or at least a large part of the, for example, cylindrical motor can which radially separates the motor rotor in the pump gas part from the motor stator. The inside of the motor can defines a large surface which is continuously flowed by the pump gas so that a high heat transfer is provided.

Even if the gas pump is arranged in a relatively hot environment, for example, close to an internal combustion engine or the engine's exhaust system, the pump and in particular the motor stator can be cooled down to a temperature far below the temperature in the proximity of the pump.

In order to improve the thermal conductivity of the mounting frame, thermally high-conductive filler material is provided in the plastic material matrix so that the thermal load of the stator of the motor is dissipated more effectively. The ohmic resistance of the stator coil consequently remains relatively low so that the electrical efficiency of the automotive electrical gas pump is improved. The thermal load on the power semi-conductors is also reduced indirectly because of the low temperature of the stator.

In an embodiment of the present invention, the motor stator can, for example, comprise a single electro-magnetic coil. The automotive electrical gas pump can be designed to be very compact. Because manufacturing costs for additional electro-magnetic coils are omitted, the gas pump can also be manufactured more economically.

In an embodiment of the present invention, the mounting frame can, for example, be in thermal contact with the electro-magnetic coil and with a magnet yoke of the stator. The mounting frame thereby contacts the electro-magnetic coil and the magnet yoke of the stator in a heat conductive manner. The heat generated in the electro-magnetic coil and in the magnet yoke of the motor stator is directly dissipated to the pump gas.

In an embodiment of the present invention, the plastic material of the mounting frame can, for example, be a polyamide plastic such as, for example, Polyamid 6 (PA6) or Polyamid 66 (PA66). This plastic material has a high mechanical strength and a high thermostability so that a mounting frame can be provided which is perfectly adapted to the requirements in the automotive gas pump.

In an embodiment of the present invention, the high-conductive filler material can, for example, consist of ceramic particles. Ceramic particles, for example, boron nitride, have a high thermal conductivity and thereby improve the total thermal conductivity of the plastic material. The thermal conductivity of the mounting frame is adaptable by defining the suitable concentration of ceramic particles evenly distributed in the plastic material. The heat generated by the electronically commutated motor stator and, indirectly, of the circuit board is thereby effectively dissipated.

The high-conductive filler material alternatively consists of mineral particles. Mineral particles and ceramic particles significantly improve the total thermal conductivity of the plastic material.

The thermal conductivity of the mounting frame can, for example, be is in the range of 2-10 W/(m×K). The heat can consequently be effectively conducted to the pumping medium. The thermal conductivity of the mounting frame can, for example, be in the range of 5-10 W/(m×K). The thermal conductivity of the mounting frame can, for example, be in the range of 2-5 W/(m×K).

In an embodiment of the present invention, the mounting frame can, for example, comprise a plurality of ribs. The ribs are formed as longitudinal protrusions on the mounting frame. These ribs can, for example, be provided at a side of the mounting frame facing away from the motor stator and facing the electronics. The ribs have the effect that the surface area of the mounting frame is increased. The heat dissipation of the mounting frame is consequently improved. These ribs also improve the stiffness of the mounting frame so that the wall thickness of the mounting frame can be reduced. The total amount of plastic material of the mounting frame can thereby be reduced so that the mounting frame can be manufactured more economically.

In an embodiment of the present invention, a separate cover can, for example, be provided which separates the pump gas section from the electronics chamber comprising the electric circuit board. The cover can, for example, be of another material than the mounting frame. The cover which is provided as an independent separate part fluidically closes an open axial end of the motor can, namely, the end which faces to the electronics chamber. The cover is of a material which is different from the material of the mounting frame so that the cover material can be chosen to be perfectly adapted with respect to its thermal conductivity. In an embodiment of the present invention, the separate cover can, for example, be in direct thermal contact with the electric circuit board and/or with the power semiconductors so that the heat of the electronics is conducted via the separate cover to the cooler pump gas. The electric circuit board is thereby also effectively cooled.

A detailed description of an embodiment of the present invention is set forth below under reference to the drawings.

FIG. 1 shows an exploded view of the automotive electrical gas pump 10 according to the present invention. The gas pump 10 comprises a pump housing 14 which comprises a motor part 18, a pump part 22 covering a first axial end of the motor part 18, and an electronics chamber cover 26 covering a second axial end of the motor part 18 opposite to the pump part 22. The pump part 22 is provided with an axial gas inlet port 30 for sucking gas into the pump housing 14 and further comprises a tangential gas outlet port 34 through which the pumped gas can be expelled out of the pump housing 14. The motor part 18 is provided with an electric connector portion 38. The electric connector portion 38 is connectable with a complementary electric connector (not shown in the drawings) for providing electric energy to the electronically commutated motor 42 of the gas pump 10.

The motor part 18 forms an electronics chamber 46, which is closed by the electronics chamber cover 26. An electronic circuit board 50 for driving a single electro-magnetic coil 54 of a motor stator 58 is arranged inside the electronics chamber 46. The motor stator 58 further comprises a bundle of laminated sheets 60 forming a magnet yoke 62 of the motor stator 58. The motor stator 58 is at least partly embedded in a stator bed 66 of a mounting frame 70.

Figure 2:
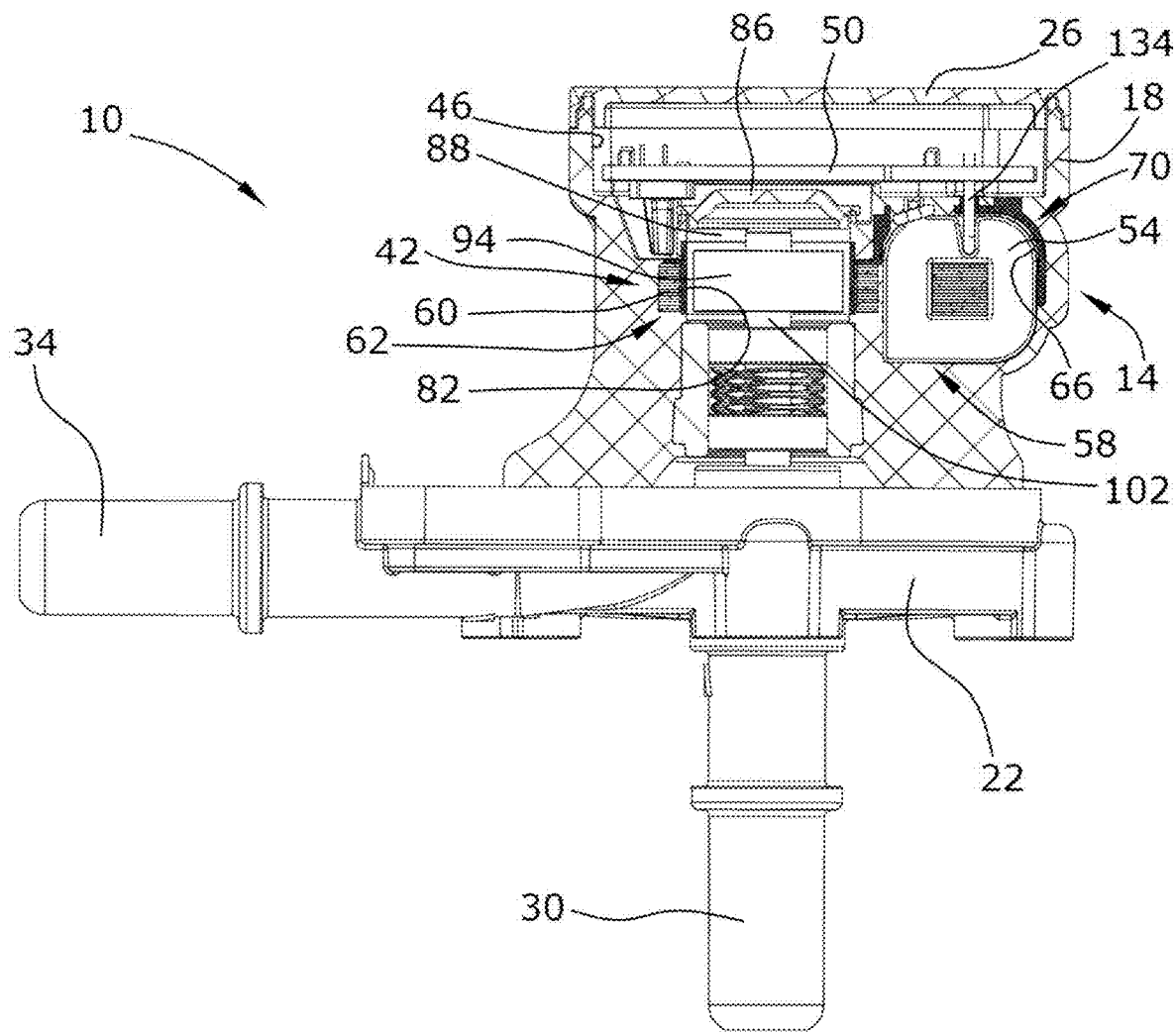
FIG. 2 shows a longitudinal section of the automotive electrical gas pump according to FIG. 1.

The mounting frame 70 which is arranged in the motor part 18 further defines a contact supporting portion 74 supporting electric contacts 78 of the electric connector portion 38. The electric contacts 78 are electrically connected to the electronic circuit board 50. The mounting frame 70 partly forms a motor can 82 which is closed at one axial can end facing the electronic circuit board 50 by a separate cover 86 (see FIG. 2). The separate cover 86 fluidically separates a gas section 88 (see FIG. 2) provided within the motor can 82 from the electronics chamber 46.

The mounting frame 70 comprises at an outer side a plurality of longitudinal ribs 90 being provided in a longitudinal direction to the motor can 82 and transversal ribs 92 being provided in a transversal direction to the motor can 82. These ribs 90, 92 improve a heat dissipation of the mounting frame 70 and the mechanical stiffness of the mounting frame 70.

The motor can 82 is radially surrounded by the bundle of laminated sheets 60. Heat of the motor stator 58 is dissipated to the cooler gas in the motor can 82 via the bundle of laminated sheets 60. Heat dissipation of the mounting frame 70 is further improved by a thermally high-conductive filler material provided in the plastic material of the mounting frame 70, for example, mineral or ceramic particles.

A permanently magnetized motor rotor 94 rotates within the motor can 82 of the mounting frame 70. A pump rotor 98 is mechanically and co-rotatably connected to the motor rotor 94 via a rotor shaft 102. The rotating pump rotor 98 pumps gas from the axial gas inlet port 30 to the tangential gas outlet port 34.

Figure 3:
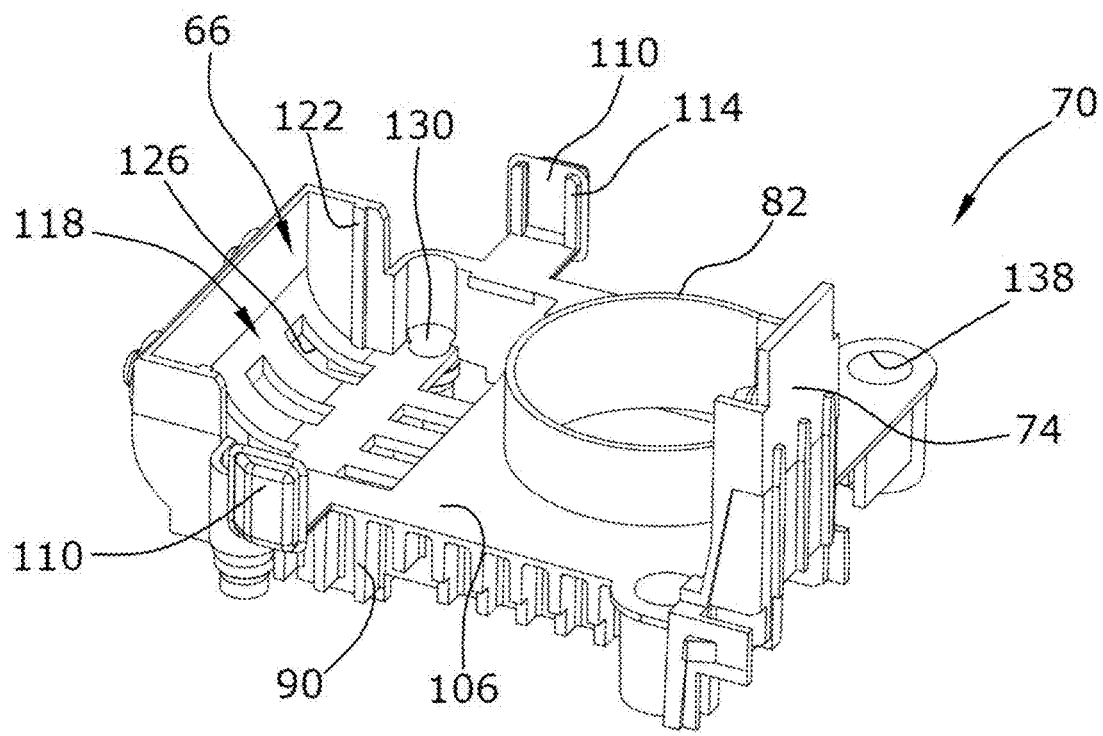
FIG. 3 shows an isometric view of the mounting frame of the automotive electrical gas pump.

FIG. 3 shows an isometric view of the mounting frame 70 showing the inside of the stator bed 66 which embeds the magnet yoke 62 and the electro-magnetic coil 54 forming the motor stator 58. The stator bed 66 comprises a plane surface 106 surrounding the motor can 82 and being perpendicular to an axial direction of the motor can 82. The magnet yoke 62 is arranged on the plane surface 106 providing a large contact area with the plane surface 106 so that heat of the magnet yoke 62 is effectively conducted to the mounting frame 70. A heat conducting paste can be provided between plane surface 106 and the magnet yoke 62 in order to further improve the heat conduction between the magnet yoke 62 and the mounting frame 70.

Yoke retaining lugs 110 comprising yoke guiding portions 114 are provided on two outer sides of the mounting frame 70 for holding and positioning the magnet yoke 62 at the mounting frame 70. The mounting frame 70 is provided with a coil receiving portion 118 formed as a hollow for receiving and embedding the electro-magnetic coil 54. The coil receiving portion 118 comprises coil guiding portions 122 for holding and positioning the electro-magnetic coil 54 in the coil receiving portion 118. Six slot openings 126 are provided at a bottom side of the coil receiving portion 118 to provide an air circulation. A cooling of the electro-magnetic coil 54 is thereby improved.

Two coil wire openings 130 are provided in the coil receiving portion 118 so that the coil wires 134 (see FIG. 1) of the electro-magnetic coil 54 are passed through the mounting frame 70. The coil wires 134 electrically connect the electro-magnetic coil 54 to the electronic circuit board 50. The mounting frame 70 further comprises mounting holes 138 which are aligned with yoke bores 142 (see FIG. 1) of the magnet yoke 62 so that both the magnet yoke 62 and the mounting frame 70 are thereby mounted to the motor part 18.

It should be clear from the above that the automotive electrical gas pump of the present invention is not limited to the above described embodiment. The motor stator could in particular also be fully embedded in the mounting frame. The cover could also be formed by the mounting frame. Reference should also be had to the appended claims.

REFERENCE SIGNS 10 automotive electrical gas pump
14 pump housing
18 motor part
22 pump part
26 electronics chamber cover
30 axial gas inlet port
34 tangential gas outlet port
38 electric connector portion
42 electronically commutated motor
46 electronics chamber
50 electronic circuit board
54 electro-magnetic coil
58 motor stator
60 bundle of laminated sheets
62 magnet yoke
66 stator bed
70 mounting frame
74 contact supporting portion
78 electric contact
82 motor can
86 separate cover
88 gas section
90 longitudinal rib
92 transversal rib
94 motor rotor
98 pump rotor
102 rotor shaft
106 plane surface
110 yoke retaining lug
114 yoke guiding portion
118 coil receiving portion
122 coil guiding portion
126 slot opening
130 coil wire opening
134 coil wire
138 mounting hole
142 yoke bore

What is claimed is:

1. An automotive electrical gas pump comprising:
a pump housing;
a motor arranged in the pump housing, the motor being configured to be electronically commutated and to drive a motor rotor to rotate within a motor can, the motor comprising a motor stator which comprises a single static electro-magnetic coil;
an electronic circuit board arranged in the pump housing, the electric circuit board being configured to drive the at least one electro-magnetic coil; and
a mounting frame arranged in the pump housing, the mounting frame comprising a motor can and a stator bed which is configured to at least in part embed the motor stator, the mounting frame being made of a plastic material comprising a thermally high-conductive filler material,
wherein,
the mounting frame is provided separately from the pump housing.

2. The automotive electrical gas pump as recited in claim 1, wherein the automotive electrical gas pump is a flow pump.

3. The automotive electrical gas pump as recited in claim 1, wherein,
the motor stator further comprises a magnet yoke, and
the mounting frame is configured to be in a thermal contact with the at least one electro-magnetic coil and with the magnet yoke of the motor stator.

4. The automotive electrical gas pump as recited in claim 1, wherein the plastic material of the mounting frame is a polyamide plastic.

5. The automotive electrical gas pump as recited in claim 1, wherein the thermally high-conductive filler material consists of ceramic particles.

6. The automotive electrical gas pump as recited in claim 5, wherein the thermal conductivity of the mounting frame is in a range of 2-10 W/(m×K).

7. The automotive electrical gas pump as recited in claim 1, wherein the thermally high-conductive filler material consists of mineral particles.

8. The automotive electrical gas pump as recited in claim 7, wherein the thermal conductivity of the mounting frame is in a range of 2-10 W/(m×K).

9. The automotive electrical gas pump as recited in claim 1, wherein the mounting frame further comprises a plurality of ribs.

10. The automotive electrical gas pump as recited in claim 1, further comprising:
a separate cover;
a pump gas section; and
an electronics chamber comprising the electric circuit board,
wherein,
the separate cover is configured to separate the pump gas section from the electronics chamber.

11. The automotive electrical gas pump as recited in claim 10, wherein the separate cover and the mounting frame are made of different materials.

* * * * *